Nov. 7, 1950          D. B. LINVILLE          2,529,033
MULTIROTOR HELICOPTER
Filed Aug. 30, 1945          4 Sheets-Sheet 1
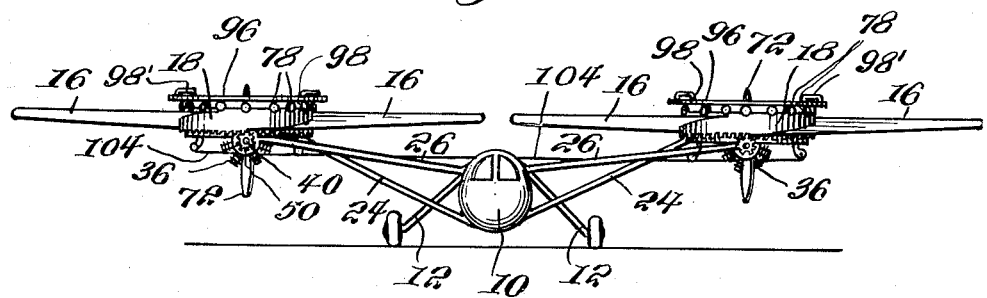
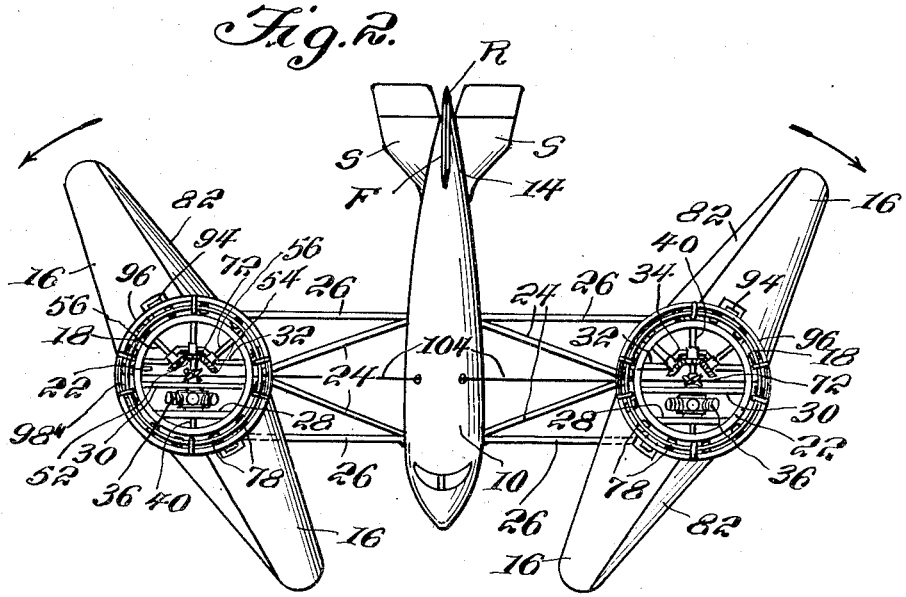
INVENTOR.
Darrell B. Linville,
BY
Victor J. Evans & Co.
ATTORNEYS

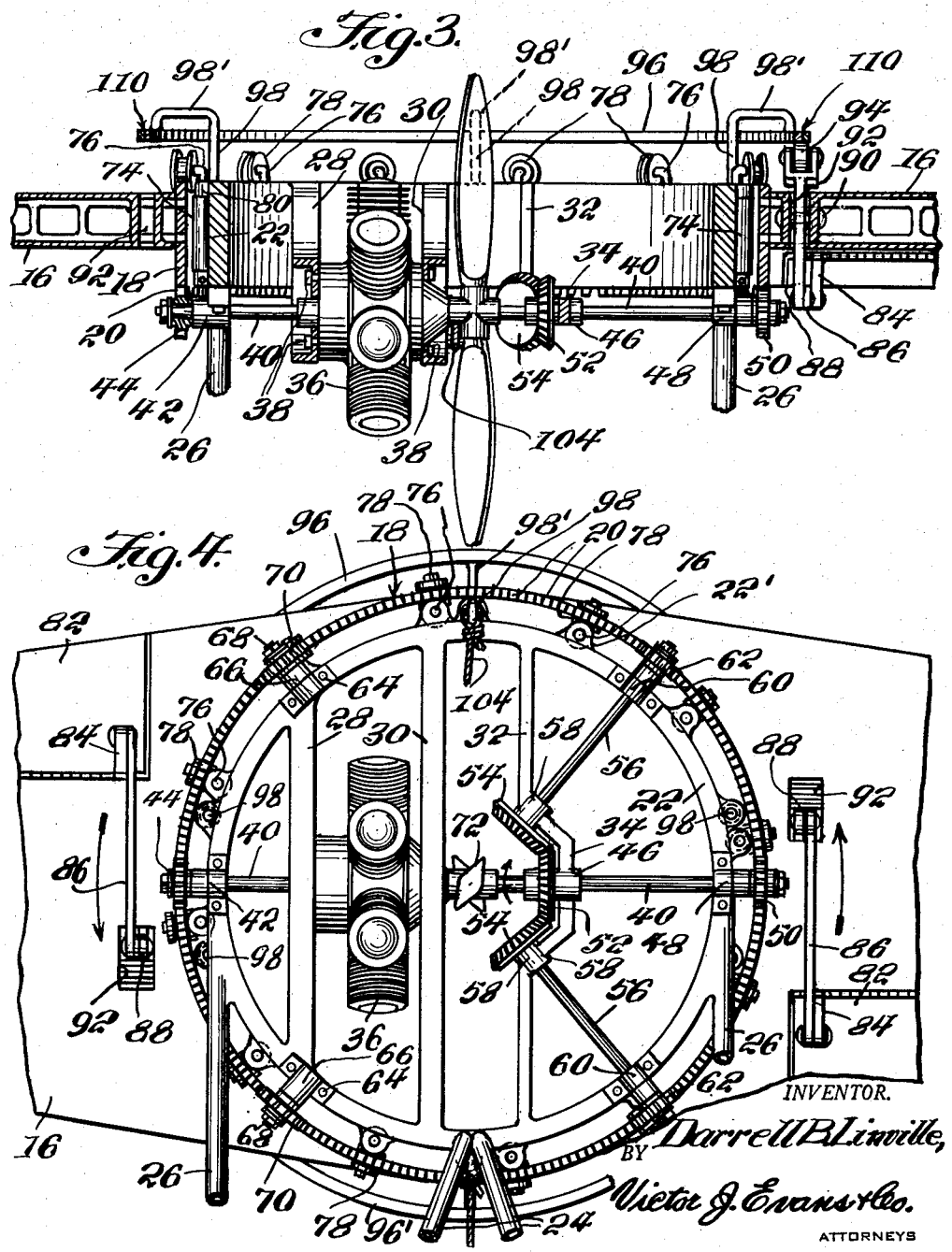

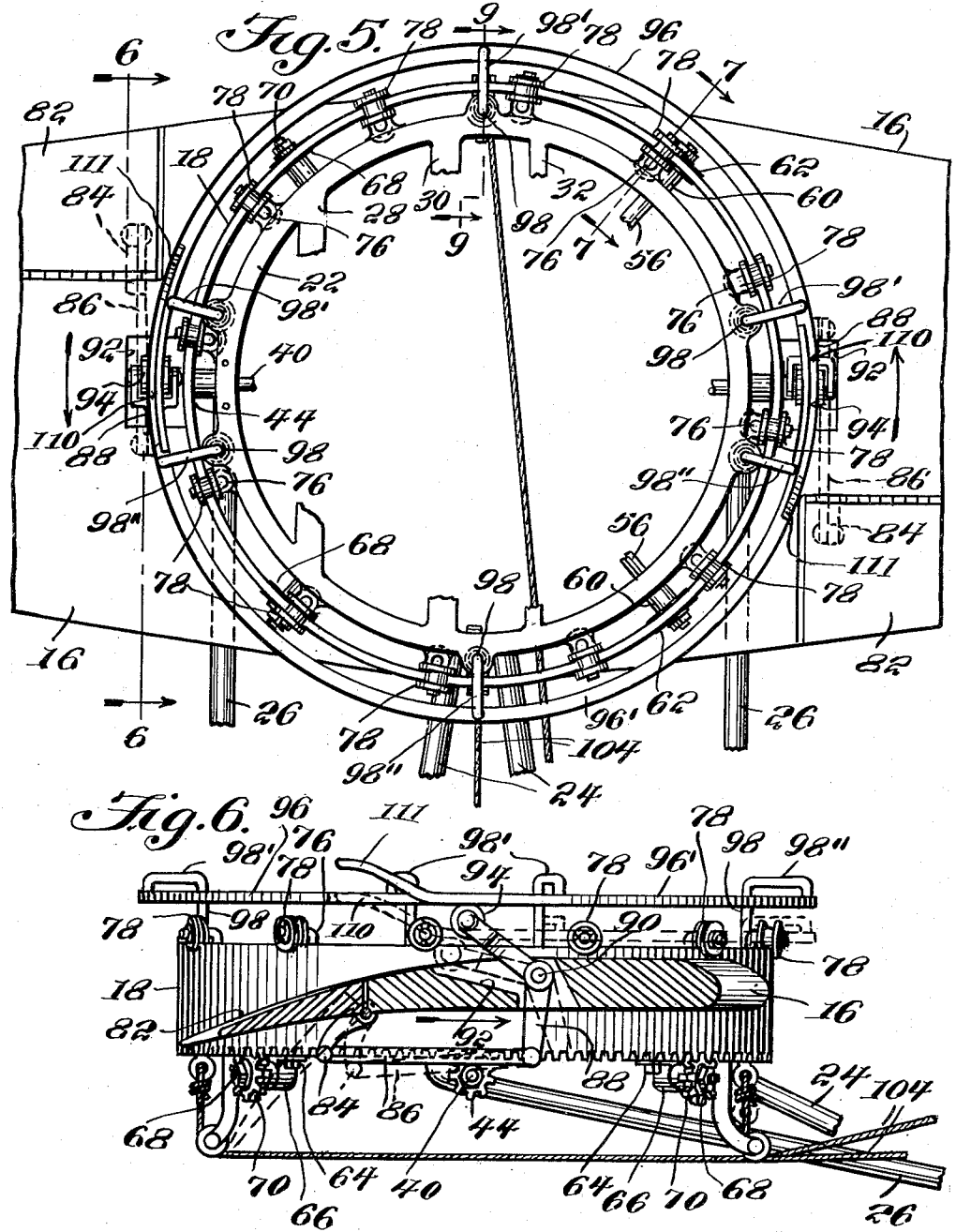

Nov. 7, 1950          D. B. LINVILLE          2,529,033
MULTIROTOR HELICOPTER
Filed Aug. 30, 1945          4 Sheets-Sheet 4
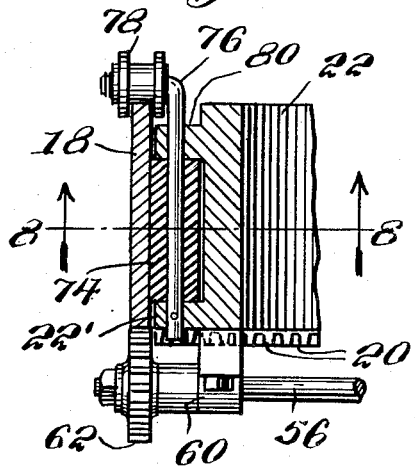
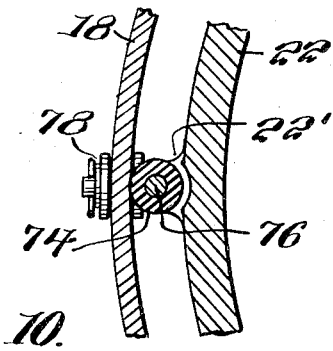
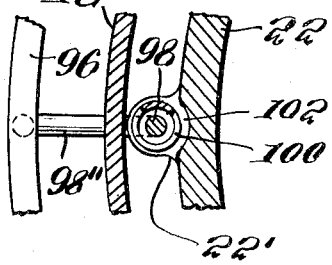
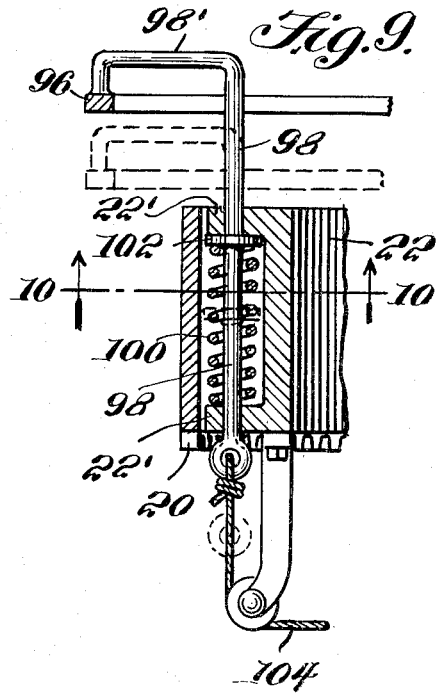
INVENTOR.
Darrell B. Linville,
BY Victor J. Evans & Co.
ATTORNEYS Patented Nov. 7, 1950

2,529,033

UNITED STATES PATENT OFFICE 2,529,033

MULTIROTOR HELICOPTER

Darrell B. Linville, Brentwood, Calif.

Application August 30, 1945, Serial No. 613,586

1 Claim. (Cl. 244—17.23)

This invention appertains to improvements in helicopters generally, and has for one of its several objects to provide a lifting rotor construction, which involves certain mechanical refinements, designed to overcome the well recognized objectionable mechanical complexity and cumbersomeness of prior types of such rotors, and which affords a more efficient, powerful, and stable lift and support to this type of rotor plane.

Another object of the invention has to do with the provision of a lifting rotor in unit assembly with a power plant, the rotor having rigidly mounted airfoils extending radially from an annular hub which is mounted for rotation about the power plant; one rotor unit being supported outwardly from each side of the fuselage in the plane of the lateral axis of the craft, so that the lifting effect of the two units is equalized on opposite sides of the plane of symmetry and the torque of one counterbalances that of the other.

A further object of the invention is to provide the rear extremities of each of the radially extending airfoils of a rotor with an aileron or wing flap, preferably of a type that has its trailing edge deflected downwardly for the purpose of imparting a lift to the airfoil, its operation being subject to control at the will of the pilot, only during the directional movement of each airfoil.

Yet another object of the invention has to do with the mounting of a pair of the lifting rotors on an aircraft in a manner that the lifting effort and torque of the same is equalized on opposite sides of the plane of symmetry, by reason of the synchronized rotation of the rotors in reversed directions and uniform rates of speed.

With these and other objects and advantages in view, the invention resides in the certain new and useful combination, construction, and arrangement of parts, as will be hereinafter more fully described, set forth in the appended claim, and illustrated in the accompanying drawings, in which:

Figure 1 is a front elevation of one form of the rotor plane, in accordance with the invention;

Figure 2 is a top plan view;

Figure 3 is an enlarged fragmentary, vertical, longitudinal section through one of the rotors, showing the unit assembly of airfoils and power plant, with pusher propeller;

Figure 4 is an enlarged fragmentary bottom plan view of the airfoil, power plant, and propeller mounting;

Figure 5 is an enlarged fragmentary top plan view of the airfoil power plant and propeller mounting opposite from Figure 4;

Figure 6 is a sectional view on the line 6—6 of Figure 5;

Figure 7 is a sectional view on the line 7—7 of Figure 5;

Figure 8 is a sectional view on the line 8—8 of Figure 7;

Figure 9 is a sectional view on the line 9—9 of Figure 5;

Figure 10 is a sectional view on the line 10—10 of Figure 9.

Referring to the drawings, wherein like characters of reference denote corresponding parts in the several views, the embodiment of the invention, as it is exemplified therein, is generally comprised in a fuselage 10 having a landing gear 12 and an empennage or tail assembly 14, all of a more or less conventional design and construction, and two lifting rotors, with independent power plant and propeller assemblies, mounted at opposite sides of the plane of symmetry.

Each rotor unit is comprised of a pair of radially extending airfoils or wing panels 16, which are rigidly mounted on an annular hub 18, that is mounted for rotation about a stationary annular frame 22, the latter constituting a support for a power plant and propeller assembly, presently to be described. The frame 22 is supported horizontally, medially of its inner side, on the outer end or apex of substantially V-shaped support 24, which extends angularly outward and upward from its point of securement beneath the fuselage 10; the outer ends or apexes of the supports 24, at opposite sides of the latter, being disposed substantially in the plane of the lateral axis of the aircraft. By making the front and rear side members of the supports 24 from continuous lengths of tubing, the lower medial portions thereof form a saddle for the seating of the fuselage 10 thereon, suitable means (not shown) being employed to secure it in place. The frame 22 is further supported by parallel members or rods 26, which extend outward and upward from the near upper side of the fuselage 10 and connect the frame at points, front and rear, ninety (90) degrees from the point of connection of the frame 24 therewith. The inner ends of the members or rods 26 are preferably secured to the fuselage commonly with the near side of the frame of the landing gear 12, substantially as shown in Figure 1.

An engine 36, preferably of the rotary type, is supported within the forward half of the frame 22, between channel cross beams 28 and 30, that have their centers downwardly angled to provide centered horizontal portions to which the engine 36 is bolted, as at 38 (Figure 3). The forwardly directed end of the engine shaft 40 extends through the cross beam 28 and a bearing 42, secured on the lower edge of the frame 22, beyond which it is provided with a drive gear 44, in mesh with gear teeth 20, formed on the lower edge of the hub 18. The rearwardly directed end of the shaft 40 extends through the cross beam 30, a bearing 46 mounted in a centrally angled offset portion of a cross beam 32, and a bearing 48, secured on the lower edge of the frame 22, beyond which it carries an idler pinion 50, in mesh with the gear teeth 20, of the hub 18. Mounted on the engine shaft 40, is a bevel gear 52, in mesh with oppositely disposed bevel gears 54, each of which is keyed on a radially extending shaft section 56, that has its inner end journalled in a bearing 58, carried in a side portion of the angled offset portion 34, of the cross beam 32, and its outer end in a bearing 60, mounted on the lower edge of the frame 22, beyond which it carries a drive gear 62, in mesh with the gear teeth 20, of the hub 18. Bracketed, as at 64, on the lower edge of the engine frame 22, equidistantly spaced to either side of the drive gear 44, are bearings 66, each of which supports a stub shaft 68 carrying an idler pinion 70, in mesh with the gear teeth 20, of the hub 18. Also, splined on the engine shaft 40, is a propeller 72, which may be either a tractor or a pusher type. By thus distributing the power developed by the engine 36, in its application to the hub 18, through the angularly spaced drive gears 44 and 62, and interposing the idler pinions 50 and 70 between the latter, the torque effect on the rotor structure is greatly reduced or equalized and a more efficient and smooth operation of the rotor is obtained, with vibration likewise reduced to a minimum. This nicety of operation is further enhanced by the provision of roller bearings 74 between the hub 18 and the frame 22 and of flanged rollers 78 engaged on the top edge of the hub 18. The roller bearings 74 are freely rotatable on vertical shafts 76, which have their lower ends supported in a flange 22' out-turned from the lower edge of the frame 22 and their upper ends outwardly angled for the mounting of the rollers 78 thereon. The roller bearings 74 are spaced at intervals about the space between the hub 18 and the frame 22 and held against vertical displacement by bearing lugs 80, formed on the outer side of the frame 22.

Each airfoil or wing panel 16 has its trailing edge formed to provide a hinged aileron or flap 82 and this is to be deflected downwardly, at the will of the pilot, through the pull of a rod 86, extending forwardly beneath the panel 16, from its point of pivoted connection with a horn 84, depending from the under side of the flap 82, and from its pivot connection with the lower end of an actuating lever 88, which is pivoted, as at 90, in a slot 92, formed in the panel 16. The upper end of the lever 88 projects upwardly from the slot 92 and is bifurcated for the mounting of a contact roller 94 therein. Overlying the outer half of the pathway traversed by the rollers 94, during the rotation of a rotor, is a vertically movable semi-circular track 96, which is supported from the upper, outwardly and downwardly, angled end portions 98', of vertically movable actuating members or rods 98, each of which extends upwardly through an opening in the flange 22', of the frame 22, and between the hub 18 and the frame. A similar semi-circular track 96' overlies the inner half of the pathway traversed by the rollers 94 and is supported in a vertically movable position in a similar manner as is track 96 by portions 98''. Each of the tracks overlap along side of each other as shown at 110 and the movable tracks 96 and 96' are provided with upturned ends 111 in order to make a positive and gentle contact as seen in Figure 6 on the inner track 96'. A coiled spring 100 is engaged on the member or rod 98, between the lower flange 22', and a collet 102, carried by the member or rod inwardly of the top side of the space between the hub 18 and the frame 22; the several springs acting to hold the track 96 normally elevated from the path of the rollers 94. The lower ends of members or rods 98 are provided with eyes for the attaching thereto of a cable 104, leading to the pilot's position within the fuselage 10.

In operation, and with the rotors mounted as shown in Figure 2, they are to be driven in synchronism at the same rate of speed and in reversed directions, as indicated by the arrows. With the propellers 72 disconnected from the engine shaft 40, by suitable clutch devices (not shown) under the control of the pilot, the lift of the craft will be in the vertical direction and, when at a desired altitude, the craft is caused to travel forward, upon the operation of the clutch devices to connect the propellers to the shaft. Lateral control of the craft in flight is effected by a downward deflection of the ailerons or flaps 82, of one or the other of the rotors, which is accomplished by the independent manipulation of the cables 104 to lower respectively either of the tracks 96 into the path of the rollers 94, causing a rearward movement of the lever 88 and a forward pull on a rod 86 and the horn 84. By reason of the semi-circular forms of the tracks 96 and 96', and these overlapping, the ailerons or flaps 82 are deflected only during the movement of each of the airfoils or panels 16 and they will be intermittently deflected in each revolution of a rotor, as long as the track is held depressed. The operation of the ailerons is the same for all forms of my invention, as for instance, the structure shown in Figure 5. Upon release of the cables 104, the tracks 96 are returned to elevated positions by the action of the springs 100. Turns are to be effected from the rudder R, forming a part of the empennage assembly 14, which includes the horizontal stabilizers S and a vertical fin F, the latter having the rudder hinged to its rear edge.

What I claim is:

In a helicopter, comprising a fuselage, a pair of lifting rotors mounted on the fuselage at the opposite sides of the plane of symmetry thereof, each rotor comprising an annular hub, oppositely disposed airfoils rigidly mounted on each hub radially thereof, a pair of horizontally disposed circular frames, supports fixed to the fuselage on opposite sides thereof and to each frame for supporting said frames on opposite sides of the fuselage in fixed relation to said fuselage, an engine within and carried by each frame, gear teeth on the lower periphery of each hub, gear means operatively connecting the gear teeth on each hub with each engine whereby said engines are adapted to rotate said rotors and each engine can be regulated as to speed so that the engines will rotate in synchronism and in reverse direction, a pair of semi-circular tracks disposed above each hub in opposed relation to each other and in parallel relation to each hub, the ends of the track being in overlapping relation to each other, a pivoted flap mounted at the trailing edge of each of said airfoils, linkage means connected to each of said flaps, each linkage means including a roller engageable with said tracks, and means connected to said tracks for causing said tracks to be moved into or out of operative engagement with said rollers.

DARRELL B. LINVILLE.

REFERENCES CITED

The following references are of record in the file of this patent:

UNITED STATES PATENTS

| Number | Name | Date |
|---|---|---|
| 1,254,496 | Goldsworthy | Jan. 22, 1918 |
| 1,848,306 | Bluhm | Mar. 8, 1932 |
| 1,849,235 | Kibbe | Mar. 15, 1932 |
| 1,849,766 | McGuire | Mar. 15, 1932 |
| 1,915,855 | Hess | June 27, 1933 |
| 2,372,481 | Gagas | Mar. 27, 1945 |
| 2,389,798 | Main | Nov. 27, 1945 |

FOREIGN PATENTS

| Number | Country | Date |
|---|---|---|
| 276,872 | Great Britain | Sept. 8, 1927 |